(12) United States Patent
Chen et al.

(10) Patent No.: US 7,481,648 B1
(45) Date of Patent: Jan. 27, 2009

(54) SIDE MOLD WORKING MECHANISM

(75) Inventors: Chih-yu Chen, Tu-Cheng (TW);
Jian-guang Huang, Tu-Cheng (TW);
Chun-yan Wu, Tu-Cheng (TW);
Yuan-ru Sun, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/984,344

(22) Filed: Nov. 16, 2007

(51) Int. Cl.
*B29C 33/44* (2006.01)
*B29C 45/44* (2006.01)

(52) U.S. Cl. .................. 425/441; 425/577; 425/DIG. 58

(58) Field of Classification Search .................. 264/318; 425/556, 577, 192 R, 441, DIG. 58, DIG. 5
See application file for complete search history.

(56) References Cited

U.S. PATENT DOCUMENTS

| | | | |
|---|---|---|---|
| 2,994,921 A * | 8/1961 | Hultgren | 425/308 |
| 3,811,645 A * | 5/1974 | Feist | 249/68 |
| 4,515,342 A * | 5/1985 | Boskovic | 249/122 |
| 4,768,747 A * | 9/1988 | Williams et al. | 249/63 |
| 4,889,480 A * | 12/1989 | Nakamura et al. | 425/577 |
| 5,397,226 A * | 3/1995 | Vandenberg | 425/192 R |
| 6,116,891 A * | 9/2000 | Starkey | 425/556 |
| 6,235,231 B1 * | 5/2001 | Martin | 264/328.1 |
| 6,443,723 B1 * | 9/2002 | Buttigieg | 425/214 |
| 7,121,823 B2 * | 10/2006 | Chen et al. | 425/438 |
| 7,175,421 B2 * | 2/2007 | Takemoto et al. | 425/577 |
| 7,381,051 B2 * | 6/2008 | Wang et al. | 425/577 |
| 7,387,505 B1 * | 6/2008 | Chen et al. | 425/190 |
| 2002/0074694 A1 * | 6/2002 | Kurimoto | 264/318 |
| 2004/0247726 A1 * | 12/2004 | Takemoto et al. | 425/190 |
| 2005/0208172 A1 * | 9/2005 | Buttigieg | 425/441 |
| 2006/0045933 A1 * | 3/2006 | Chen et al. | 425/438 |

* cited by examiner

*Primary Examiner*—Yogendra Gupta
*Assistant Examiner*—Emmanuel S Luk
(74) *Attorney, Agent, or Firm*—Rosenberg, Klein & Lee

(57) ABSTRACT

A side mold working mechanism includes a cavity plate defining a mounting groove forming a receiving hole. Bilateral sides of the mounting groove hollow toward bilateral sides of the cavity plate to form two hollow grooves. Two guide blocks disposed in the hollow grooves have a leading track. The guide block defines a locating recess communicating with the leading track. Two locating blocks fixedly mounted in the locating recesses have a preventing portion placed on the leading track. A slide is movably assembled in the mounting groove. Bilateral sides of the top of the slide protrude outward to form two shoulders slidably supported by the leading tracks and capable of being blocked by the preventing portions. The top of the slide defines an inclined groove and an angular pin has an inclined bottom end for being inserted into or withdrawn out of the inclined groove from the receiving hole.

7 Claims, 3 Drawing Sheets

SIDE MOLD WORKING MECHANISM

BACKGROUND OF THE INVENTION

1. Field of the Invention

The present invention relates to a side mold working mechanism, and more particularly to a side mold working mechanism capable of locating a slide thereof for preventing undue return of the slide.

2. The Related Art

Generally speaking, a plastic product is shaped in a main mold through a method of injection molding. But if the plastic product needs to define a hole or a cavity thereon, a side mold is provided to mate with the main mold to shape the hole or the cavity on the plastic product.

The side mold includes a slide, a pair of guide blocks and an angular pin. The slide disposes a shaping member at the front thereof to be inserted in the main mold for shaping the hole or the cavity on the plastic product when the plastic product is formed in the main mold. As the plastic product becomes more and more compact, the slide correspondingly becomes smaller according with the compact plastic product. The slide is driven moving along leading tracks defined on the guide blocks by the angular pin fixed on a top clamping plate and a spring. When the angular pin is drawn out from the slide completely, the slide moves backward continually because of the elastic force of the spring and so the slide is prone to returning unduly, which brings a bad influence on the following shaping processes of the plastic product. Conventionally, in order to solve the problem, locating screws are disposed in the rear of the slide or locating bearings are disposed on the top of a cavity insert to engage with the slide for limiting the return travel of the slide. However, because the slide is quite small, the slide has no space to mount the locating screws or to couple with the locating bearings. If the locating screws are disposed in the slide constrainedly, the intensity of the slide becomes weak, which influences the quality of the plastic product and the using lift of the slide.

SUMMARY OF THE INVENTION

Accordingly, an object of the present invention is to provide a side mold working mechanism capable of locating a slide thereof for preventing undue return of the slide.

To achieve the object, the side mold working mechanism includes a cavity plate defining a mounting groove therein. The center of the mounting groove defines a receiving hole passing through the top of the cavity plate. Bilateral sides of the mounting groove hollow toward bilateral sides of the cavity plate to form a pair of hollow grooves. A pair of guide blocks is disposed in the hollow grooves of the cavity plate. A top surface of the guide block is cut downward at a side thereof to form a leading track passing through the guide block. The guide block defines a locating recess passing therethrough and communicating with the leading track. A pair of locating blocks is fixedly mounted in the locating recesses of the guide blocks respectively. The locating block has a preventing portion extending out of the locating recess and placed on the leading track of the guide block. A slide is movably assembled in the mounting groove of the cavity plate. Bilateral sides of the top of the slide protrude outward to form two shoulders slidably supported by the leading tracks of the guide blocks and capable of being blocked by the preventing portions of the locating blocks. The top of the slide defines an inclined groove. And an angular pin has an inclined bottom end for being inserted into or withdrawn out of the inclined groove of the slide from the receiving hole of the cavity plate, which drives the slide moving forward or backward along the leading tracks of the guide blocks.

As described above, the slide is located exactly in the working processes of the side mold working mechanism through the preventing portions disposed on the leading tracks, avoiding undue return of the slide. The design of the present invention ensures the quality of a product shaped in a main mold cooperating with the side mold working mechanism and the intensity of the slide.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
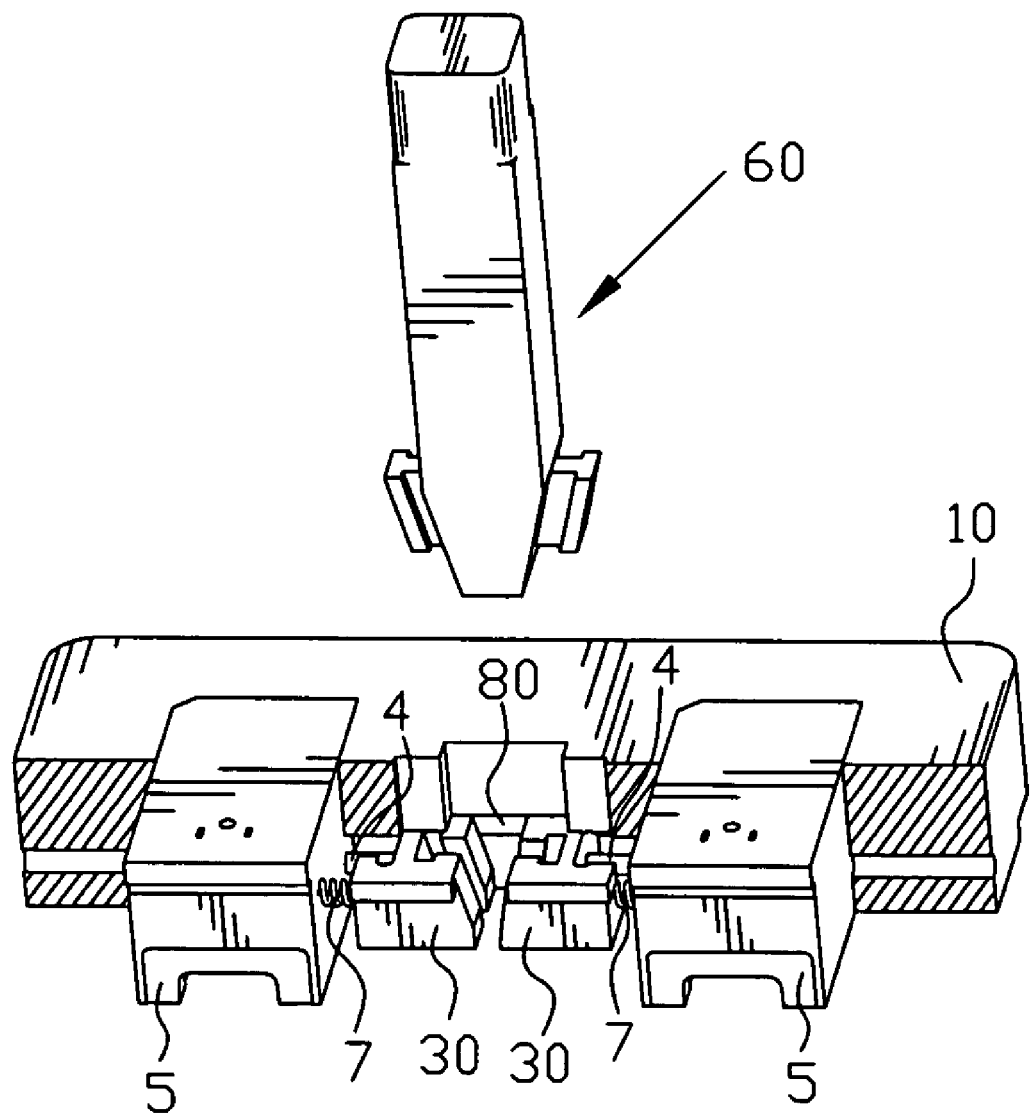
FIG. 1 is a perspective view of a side mold working mechanism with a cavity plate cut partially and a guide block left out.
Figure 2:
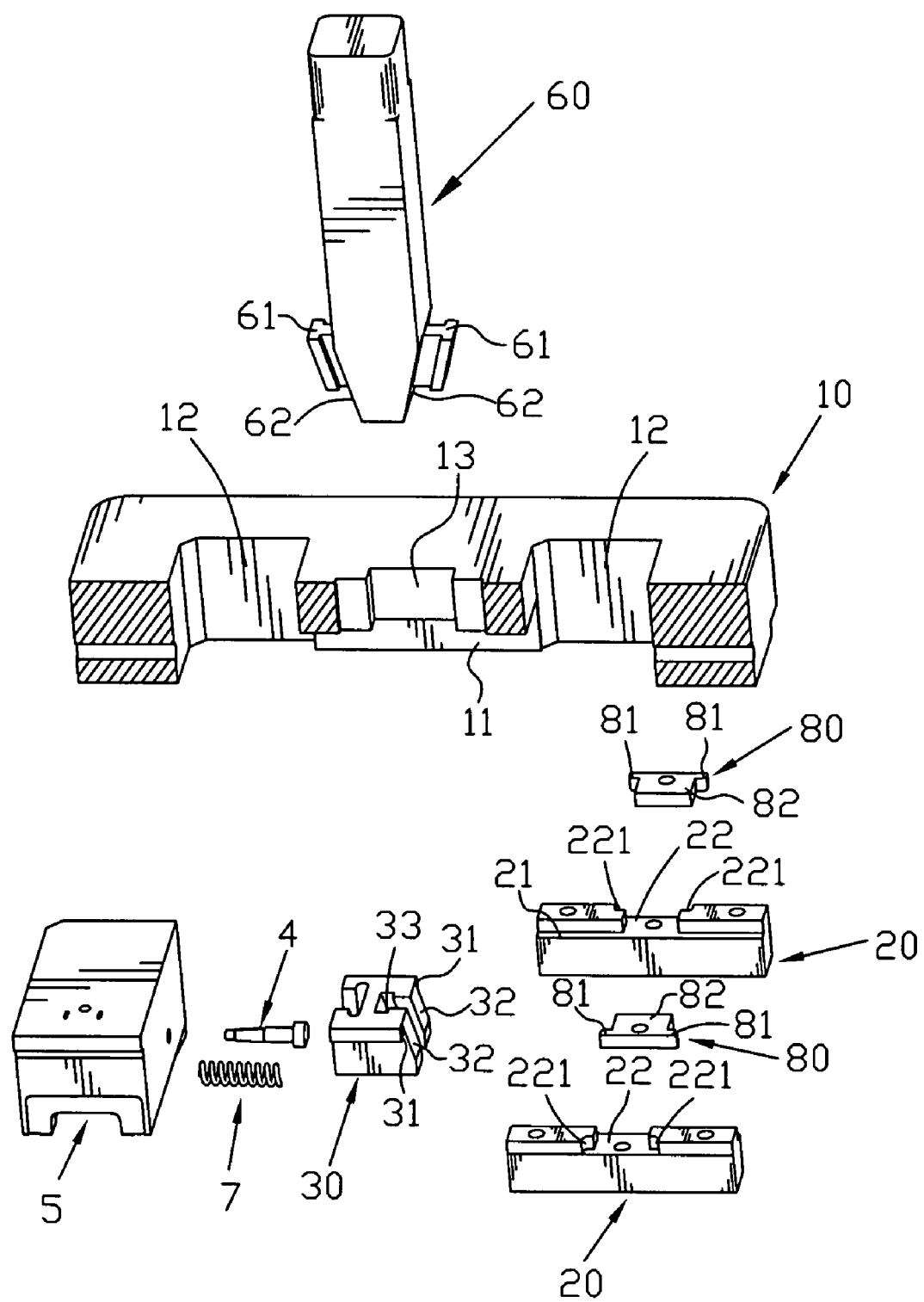
FIG. 2 is an exploded view of the side mold working mechanism, which leaves out one group of main molds, slides, shaping shafts and springs.

Please refer to FIG. 1 and FIG. 2. A side mold working mechanism mating with a main mold 5 for shaping a hole or a cavity on a product shaped in the main mold 5 includes a cavity plate 10, a pair of guide blocks 20 and an angular pin 60. Because the cavity plate 10 symmetrically receives two main molds 5 therein, the side mold working mechanism includes two slides 30 arranged oppositely, two shaping shafts 4 respectively mounted on front surfaces of the slides 30 and two springs 7 respectively disposed on the front surfaces of the slides 30 and near the shaping shafts 4.

Figure 4:
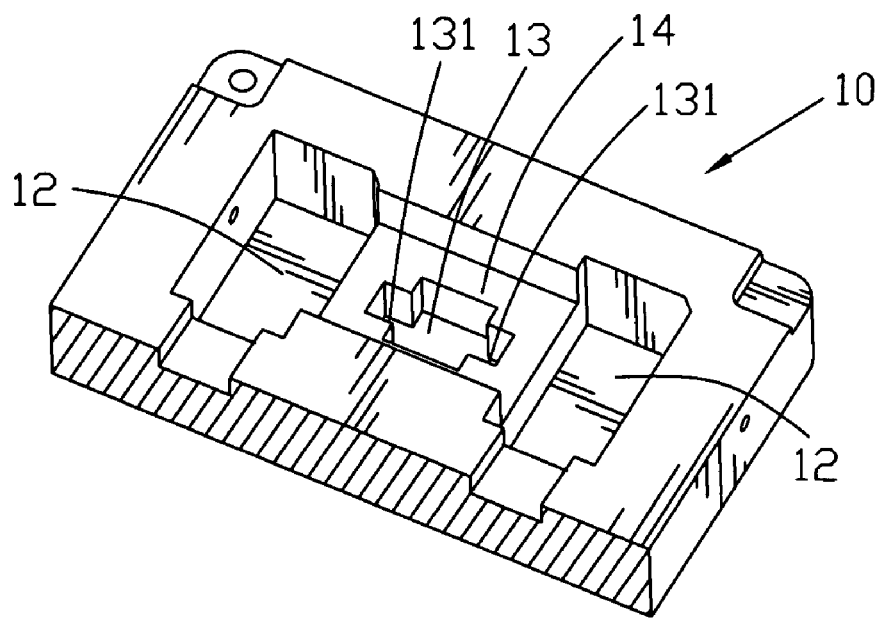
FIG. 4 is a perspective view of the cavity plate of the side mold working mechanism.

With reference to FIG. 2 and FIG. 4, the bottom of the cavity plate 10 transversely defines two receiving recesses 12 at the front and rear ends thereof for receiving the main molds 5 therein. The middle of the bottom of the cavity plate 10 longitudinally defines a mounting groove 14 communicating with the receiving recesses 12 respectively. The center of the mounting groove 14 defines a receiving hole 13 passing through the top of the cavity plate 10. The front and rear of the receiving hole 13 define two inserting gaps 131 at center. Bilateral sides of the mounting groove 14 hollow toward bilateral sides of the cavity plate 10 to form a pair of hollow grooves 11 at bottom.

Referring to FIG. 2, the guide block 20 is a rectangular strip of block and disposed longitudinally in the hollow groove 11 of the cavity plate 10. A top surface of the guide block 20 is cut downward at an inner side thereof to form a leading track 21 longitudinally passing through the guide block 20. A middle of the guide block 20 transversely defines a locating recess 22 passing therethrough and communicating with the leading track 21. Both sides of the locating recess 22 define a locking gap 221 on an outer side of the guide block 20.

A pair of locating blocks 80 are mounted in the locating recesses 22 of the guide blocks 20. The locating block 80 has a board-shaped preventing portion 82 extending out of the locating recess 22 and placed on the leading track 21 of the guide block 20. An opposite end of the preventing portion 82 protrudes outward at bilateral sides thereof to form two locking portions 81 disposed in the locking gaps 221 of the guide block 20.

The slides 30 are movably assembled in the mounting groove 14 of the cavity plate 10 oppositely. Bilateral sides of the top of the slide 30 protrude outward to form two shoulders 31 slidably supported by the leading tracks 21 of the guide blocks 20. A rear surface of the slide 30 is defined as a first inclined surface 32. The top of the slide 30 defines an inclined T-shaped groove 33 extending to pass through the top and bottom of the slide 30 and longitudinally running through the first inclined surface 32. The front surface of the slide 30 disposes the shaping shaft 4 and the spring 7 adjacent to the shaping shaft 4.

The angular pin 60 vertically fixed on a top clamping plate (not shown) and snugly fitted in the receiving hole 13 of the cavity plate 10 has a wedge-shaped bottom end which forms two second inclined surfaces 62 at a front surface and a rear surface thereof. An inclined T-shaped block 61 that inclines to the bottom end of the angular pin 60 protrudes from the second inclined surface 62.

Figure 3:
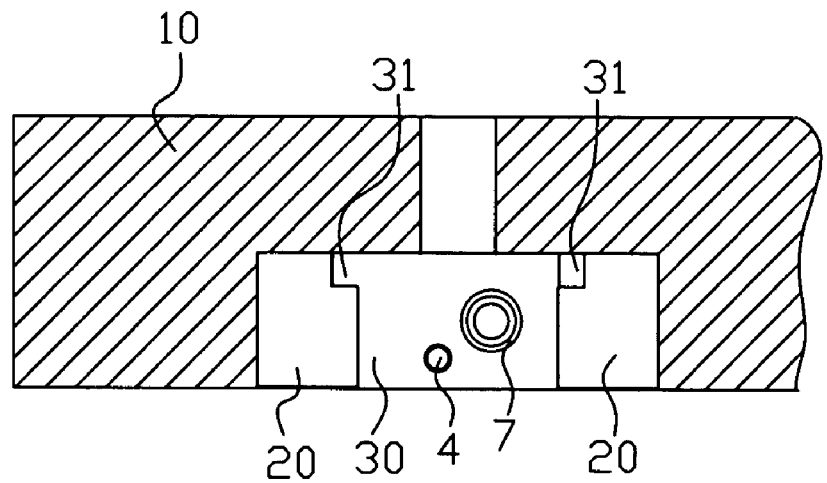
FIG. 3 is a cross sectional view of the side mold working mechanism without an angular pin.

Referring to FIG. 1, FIG. 2 and FIG. 3, in working, at the closing process of the main molds 5, the angular pin 60 is inserted in the receiving hole 13 of the cavity plate 10 from up and down and then the angular pin 60 is pressed downward continually. The T-shaped blocks 61 are fittingly embedded in the T-shaped grooves 33 of the slides 30 and the second inclined surfaces 62 are against the first inclined surfaces 32. At the same time, the slides 30 are driven moving toward the main molds 5 along the leading tracks 21 of the guide blocks 20. Then the shaping shafts 4 are inserted in the main molds 5 to shape the holes or the cavities on the products formed in the main molds 5, and the springs 7 are compressed. In contrast, after the products are shaped completely, at the opening process of the main molds 5, the angular pin 60 is withdrawn from the slides 30. The T-shaped blocks 61 are pulled out from the T-shaped grooves 33. Meanwhile, the slides 30 are driven moving away from the main molds 5 along the leading tracks 21. The elastic force stored in the springs 7 help to drive the slides 30 moving continually along the leading tracks 21. The slides 30 stop moving until the shoulders 31 are blocked by the preventing portions 82 of the locating blocks 80 extending out of the locating recesses 22 of the guide blocks 20 and placed on the leading tracks 21. The shaping shafts 4 are moved away from the products and the main molds 5. Then the products are taken out of the main molds 5 and other products begin to be formed in the main molds 5 respectively.

As described above, the slides 30 are located exactly in the working processes of the side mold working mechanism through the preventing portions 82 disposed on the leading tracks 21, avoiding undue return of the slides 30. The design of the present invention ensures the quality of the products shaped in the main molds 5 cooperating with the side mold working mechanism and the intensity of the slides 30.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A side mold working mechanism, comprising:
    a cavity plate, defining a mounting groove therein, the center of the mounting groove defining a receiving hole passing through the top of the cavity plate, bilateral sides of the mounting groove hollowing toward bilateral sides of the cavity plate to form a pair of hollow grooves;
    a pair of guide blocks, disposed in the hollow grooves of the cavity plate respectively, a top surface of the guide block cut downward at a side thereof to form a leading track passing therethrough, the guide block defining a locating recess passing therethrough and communicating with the leading track;
    a pair of locating blocks, fixedly mounted in the locating recesses of the guide blocks respectively, the locating block having a preventing portion extending out of the locating recess and placed on the leading track of the guide block;
    a slide, movably assembled in the mounting groove of the cavity plate, bilateral sides of the top of the slide protruding outward to form two shoulders slidably supported by the leading tracks of the guide blocks and capable of being blocked by the preventing portions of the locating blocks, the top of the slide defining an inclined groove; and
    an angular pin, having an inclined bottom end for being inserted into or withdrawn out of the inclined groove of the slide from the receiving hole of the cavity plate, which drives the slide moving forward or backward along the leading tracks of the guide blocks.

2. The side mold working mechanism as claimed in claim 1, wherein the cavity plate defines two receiving recesses at the front and rear ends thereof for receiving two main molds therein, the mounting groove communicates with the receiving recesses respectively.

3. The side mold working mechanism as claimed in claim 1, wherein the slide disposes a shaping shaft and a spring adjacent to the shaping shaft in the front thereof.

4. The side mold working mechanism as claimed in claim 1, wherein the locating recess of the guide block defines two locking gaps at both sides thereof, an opposite end of the preventing portion protrudes outward at bilateral sides thereof to form two locking portions disposed in the locking gaps.

5. The side mold working mechanism as claimed in claim 1, wherein the inclined groove of the slide is T-shaped and extends to pass through the top and bottom of the slide and a rear surface of the slide, the inclined bottom end of the angular pin protrudes to form an inclined T-shaped block inclining to the bottom end and embedded in the inclined groove.

6. The side mold working mechanism as claimed in claim 5, wherein the slide defines a first inclined surface at a rear surface thereof, the bottom end of the angular pin is wedge-shaped and defines a second inclined surface against the first inclined surface of the slide.

7. A side mold working mechanism, comprising:
    a cavity plate, symmetrically defining two receiving recesses and a mounting groove communicating with the receiving recesses respectively, the center of the mounting groove defining a receiving hole passing through the top of the cavity plate, bilateral sides of the mounting groove hollowing toward bilateral sides of the cavity plate to form a pair of hollow grooves;
    a pair of guide blocks, disposed in the hollow grooves of the cavity plate respectively, a top surface of the guide block cut downward at a side thereof to form a leading track passing therethrough, the middle of the guide block defining a locating recess passing therethrough and communicating with the leading track;

a pair of locating blocks, fixedly mounted in the locating recesses of the guide blocks respectively, the locating block having a preventing portion extending out of the locating recess and placed on the leading track of the guide block;

a pair of slides, movably assembled in the mounting groove of the cavity plate oppositely, bilateral sides of the top of the slide protruding outward to form two shoulders slidably supported by the leading tracks of the guide blocks and capable of being blocked by the preventing portions of the locating blocks; and an angular pin, disposed between the slides for driving the slides moving towards each other or away from each other along the leading tracks of the guide blocks.

* * * * *